United States Patent [19]

Buchele

[11] 4,278,036

[45] Jul. 14, 1981

[54] ROTARY TILLER SLOT PLANTER AND METHOD FOR USING SAME

[75] Inventor: Wesley F. Buchele, Ames, Iowa

[73] Assignee: Iowa State University Research Foundation, Inc., Ames, Iowa

[21] Appl. No.: 90,516

[22] Filed: Nov. 2, 1979

[51] Int. Cl.³ .............................................. A01C 7/06
[52] U.S. Cl. ...................................... 111/52; 111/73; 111/85
[58] Field of Search .................................. 111/1, 6–7, 111/9, 10, 34, 73, 52, 80, 85, 86, 87; 172/63, 65, 123, 149, 156, 177, 179, 187, 196

[56] References Cited

U.S. PATENT DOCUMENTS

| 2,734,439 | 2/1956 | Padrick | 111/80 X |
|---|---|---|---|
| 2,920,586 | 1/1960 | Negreira | 172/65 X |
| 2,924,189 | 2/1960 | McLeod | 111/85 X |
| 3,033,135 | 5/1962 | Gouin | 111/85 X |
| 3,220,368 | 11/1965 | Gandrud | 111/9 |
| 3,348,505 | 10/1967 | Smith | 111/73 |
| 3,373,705 | 3/1968 | Hansen et al. | 111/73 |
| 3,685,468 | 8/1972 | Paige et al. | 111/73 X |
| 3,698,485 | 10/1972 | Trimpe et al. | 172/65 |
| 3,970,012 | 7/1976 | Jones | 111/6 |
| 4,002,205 | 1/1977 | Falk | 172/123 X |

FOREIGN PATENT DOCUMENTS

| 298262 | 3/1971 | U.S.S.R. | 172/63 |
|---|---|---|---|
| 446118 | 12/1974 | U.S.S.R. | 111/85 |

Primary Examiner—James R. Feyrer
Attorney, Agent, or Firm—Zarley, McKee, Thomte, Voorhees & Sease

[57] ABSTRACT

The rotary tiller slot planter of the present invention comprises a subsoiler shank positioned to engage the soil and make a trench therein. A pair of rotary tiller blades are rotatably mounted on the opposite sides of the sub-soil shank in planes parallel thereto. The centerlines of the rotary tiller wheels are located behind the subsoil shank. Each of the wheels have a plurality of blades extending radially outwardly from the rotational axis thereof and terminating in outer radial ends which engage the soil slightly ahead of the subsoiler shank and adjacent the lateral edges of the trench. A seed tube shank is positioned behind the subsoiler shank and between the tiller wheels. The seed tube shank has a lower end positioned to extend below the soil surface. A seed tube is positioned behind the seed tube shank for depositing seed in the soil. The rotation of the blades on opposite sides of the subsoil shank causes the soil to be mechanically aggregated and aerated and helps prepare a seed bed for the seeds. Also, the rotating tiller blades chop the debris which may be along the trench and throw soil backwards so as to cover the planted seed. Shorter rotary blades on the tiller wheels are shaped to throw debris and the upper one-half inch of soil sideways away from the row.

15 Claims, 9 Drawing Figures

U.S. Patent
Jul. 14, 1981
4,278,036
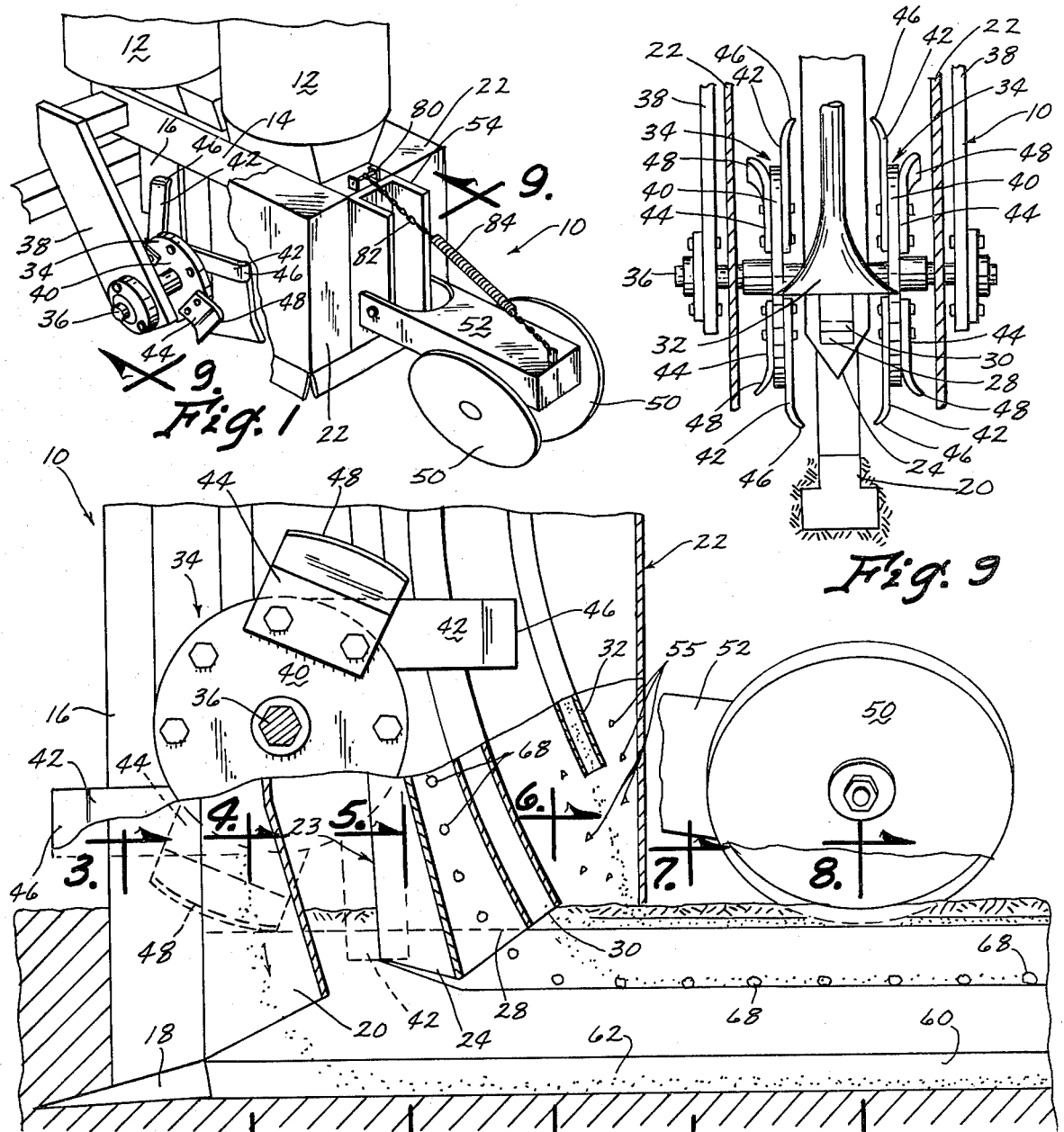
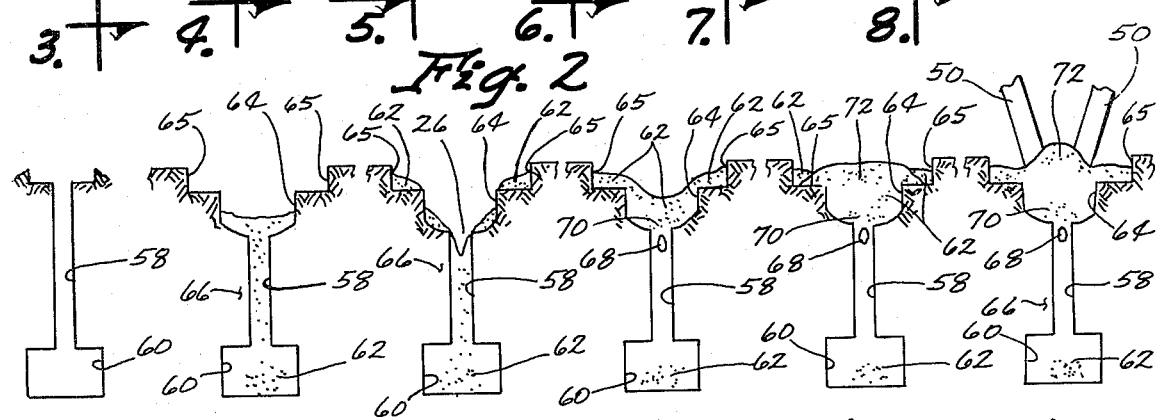
Fig. 3  Fig. 4  Fig. 5  Fig. 6  Fig. 7  Fig. 8

ROTARY TILLER SLOT PLANTER AND METHOD FOR USING SAME

BACKGROUND OF THE INVENTION

This invention relates to minimum tillage planters and particularly to a rotary tiller slot planter and method for using same.

In recent years minimum tillage planting has become a more popular system for planting crops. One problem of minimum tillage planting stems from the scattered debris on the surface of the soil. This debris includes stalks and remains of the crop planted from the previous year. This debris on the surface of the soil often becomes entangled in the planting and cultivating equipment, thereby rendering the equipment unworkable until disentangled. Also, the debris hinders the integrity of the seed bed, reduces the temperature and available nitrogen of the seed bed, and hinders the emergence of the plants from the seeds.

Another problem encountered with minimum tillage is the difficulty in obtaining a well prepared seed bed for the seeds. The ground must be tilled at least adjacent the places where the seeds are planted in order to obtain proper germination and growth of the seedlings. Also, the soil should be aerated adjacent the seed bed in order to insure proper germination of seeds and growth of the plants.

Another problem encountered with minimum tillage devices is the difficulty in obtaining a constant depth of the trench in which the seeds are planted. Variation in this depth will cause variation in the growth or success of the crop.

In addition to actually planting the seeds, additional operations must be performed on the seed bed. Fertilizer is usually added as well as herbicides and insecticides. It is desirable to make all of these applications at the time the seed is planted so as to minimize the number of times which the farmer must pass over the field.

SUMMARY OF THE INVENTION

The present invention utilizes a pair of rotating tiller blades which rotate on opposite sides of the planting equipment. The planting equipment includes a subsoil shank which forms the initial trench and which includes a fertilizer tube for depositing fertilizer in the bottom of the trench. Next follows a seed tube shank including a seed tube and an insecticide tube therein for depositing seed and insecticide at a level above the level where the fertilizer is initially deposited.

Immediately rearwardly of the seed tube and the insecticide tube is a herbicide tube which deposits herbicide in the flying soil being thrown over the rotating tiller blades and dropping on the seeds. Tamping or compacting wheels follow the planting device for pressing the soil on top of the seeds when needed.

The rotary tiller slot planter is designed to accomplish the following tasks while applying fertilizer, insecticide, herbicide and seeds. It opens a furrow with the subsoiler shank and places fertilizer at the bottom of the trench. The rotary tiller knives chop residue as it tends to catch on the forward edge of the subsoiler tank. This minimizes the hanging up of residue or soil on the subsoiler shank.

The rotary tiller knives throw soil into the trench left by the subsoiler shank. At the same time, they mill slots in the soil for the planter boot which follows the subsoiler shank. Also mounted on the rotary tiller blades are shorter blades which engage the debris adjacent the sides of the wide shallow trench and the first one-half inch of soil below the debris so as to throw this debris and soil away from the sides of the wide shallow trench. The bottom part of the planter boot shapes the seed trench in the loose soil which has been thrown into the original subsoiler trench by the rotary tiller knives. The seed trench is triangular shaped for the alignment of the seeds in the row.

After the seeds are dropped into the seed trench, insecticides are also deposited therein and the soil being thrown by the tiller blades covers the seeds and the insecticides. Next, a herbicide is applied by a herbicide tube and is mixed with the flying soil. A shield located behind the herbicide dispenser collects the flying soil and the herbicide and drops it on the seed filling the trench made by the combined action of the long and short blades of the rotary tiller. The firming wheels which follow the herbicide tube firm the soil over the seeds slightly.

Therefore, a primary object of the present invention is the provision of an improved rotary tiller slot planter and method for using the same.

A further object of the present invention is the provision of a device which chops the residue on the soil surface so as to minimize the normal tendency of the residue to hang up on the subsoiler shank.

A further object of the present invention is the provision of a device which aerates and mechanically aggregates the soil and prepares the soil for a proper seed bed.

A further object of the present invention is the provision of a device which mills slots in the soil for receiving the seed tube shank and the seed tube of the planter, both of which are approximately the same width.

A further object of the present invention is the provision of a device which permits the seed tube to deposit the seed at a constant and consistent depth along the row being planted.

A further object of the present invention is the provision of a device which will remove debris from along the sides of the trench and which will further remove the upper one-half inch of soil below the debris. This upper one-half inch of soil normally contains germinated weed seeds which are killed by the tillage action of the short rotary tiller blades.

A further object of the present invention is the provision of a device which permits the planting of seeds and the introduction of fertilizer, insecticide and herbicide in the same operation.

A further object of the present invention is the provision of a device which mixes and incorporates the herbicide in a layer of soil above the seeds at a predetermined depth below the surface.

A further object of the present invention is the provision of means for packing when necessary the soil on the seed from the sides of the row to reduce soil moisture loss. The soil is lightly packed when moist and heavily packed when dry.

A further object of the present invention is the provision of a device which is economical to manufacture, durable in use and efficient in operation.

BRIEF DESCRIPTION OF THE DRAWINGS

FIG. 1 is a perspective view of the present invention.

FIG. 2 is an enlarged sectional view of the planter head assembly of the present invention.

FIGS. 3–8 are sectional views taken along lines 3—3, 4—4, 5—5, 6—6, 7—7, 8—8 of FIG. 2.

FIG. 9 is a sectional view taken along line 9—9 of FIG. 1.

DETAILED DESCRIPTION OF THE INVENTION

Referring to the drawings, the numeral 10 generally designates the planting device of the present invention. Mounted on the top of device 10 are a plurality of hoppers 12 for containing seed, fertilizer, insecticide and herbicide. The number of hoppers may vary depending upon the materials desired to be applied, but in the preferred form four hoppers would be used for seed, fertilizer, herbicide and insecticide, respectively. These hoppers are mounted upon a support frame 14.

A subsoil shank 16 is fixed at its upper end to support frame 14 and extends downwardly therefrom. In cross section, subsoil shank 16 is somewhat V-shaped in cross section to enable shank 16 to engage and separate the soil as illustrated in FIG. 2. The lower end of subsoil shank 16 includes a shoe 18.

Housed within subsoil shank 16 behind the leading edge thereof is a fertilizer tube 20 which is in communication with one of the hoppers 12 containing fertilizer. The means for dispensing the fertilizer from hopper 12 into fertilizer tube 20 is conventionally known, and therefore is not described in detail herein.

Positioned behind subsoil shank 16 is a boot 22. Boot 22 contains a seed tube shank 23, a seed tube 28, an insecticide tube 30, and a herbicide dispenser 32. The forward leading edge of seed tube shank 23 is V-shaped in cross-section. At the bottom of shank 23 is a V-shaped bottom 24 which is adapted to engage the soil and which provides a V-shaped groove 26 (FIG. 5) for the seed.

Housed within boot 22 behind seed tube shank 23 are a seed tube 28 and an insecticide tube 30. Also housed within boot 22 and positioned rearwardly of insecticide tube 30 is a herbicide tube 32. The lower end of seed tube 28 is spaced below the lower end of insecticide tube 30. The lower end of herbicide dispenser 32 is spaced above the lower end of insecticide tube 30.

A pair of tiller wheels 34 are mounted on an axle 36 which extends between subsoil shank 16 and seed tube shank 23 and which is suspended from frame 14 by means of downwardly extending arms 38. Each wheel 34 comprises a hub 40, a plurality of long blades or tines 42, and a plurality of short blades or tines 44. Long blades 42 include inwardly bent tips 46, and short blades 44 include outwardly bent tips 48. Tynes 42 are positioned closely adjacent the opposite sides of shank 16 and seed tube shank 23, and the outer radial ends of blades 46 extend approximately to the depth of the lower end of seed tube shank 24. This level is spaced above the lower end of subsoil shank 16. The outer radial ends of short blades 44 extend approximately to the depth of the lower end of insecticide tube 30.

The effect of inwardly bent ends 46 on blade 42 is that debris tending to catch on subsoiler shank 16 is chopped and carried away, but that dirt engaged by these blades is thrown inwardly toward the longitudinal centerline of the trench formed by shank 16. In contrast, the effect of outwardly bent ends 48 is to throw debris and approximately one-half inch of surface soil outwardly away from the trench so as to minimize the amount of debris which is in the vicinity of the row being planted. Ends 48 also remove the upper one-half inch of surface soil which contains sprouted weed and grass seeds and growing weeds and grass. The outer ends 46 of blades 42 may be constructed with no bend at all, or with an outward bend.

A pair of seed row firming wheels 50 are mounted on a wheel frame 52 which is pivoted at its forward end to an upstanding channel 54 on support frame 14. These wheels are adapted to engage the soil after the row has been planted for tamping and firming the soil above the seeds.

Boot 22 is three sided, being open at its forward end. Boot 22 is placed in covering relation over wheels 34, seed tube shank 23, and herbicide tube 32. This boot collects the flying soil and herbicide being thrown off of wheels 34, while at the same time permitting shorter blades 44 of wheels 34 to throw debris outwardly away from the trench.

Referring to FIGS. 3–8, the various stages of the planting process are shown. In FIG. 3, the trench formed by subsoil shank 16 includes a vertical portion 58 and an enlarged lower portion 60. In FIG. 4, the fertilizer 62 is shown deposited in the bottom of enlarged portion 60 by fertilizer tube 20. Also shown in FIG. 4 is an enlarged trench portion 64 which has been formed by the rotating wheels 34 and by blades 42 thereof, and the wider shallow trench 65 formed by the rotating wheels 34 and by blades 44 thereof. Formation of enlarged portion 64 clears the width of the trench for receiving seed tube shank 23. Also by virtue of the rotation of wheels 34 a portion of the dirt picked up by these wheels is thrown by centrifugal force into the bottom of enlarged portion 64 and partially filling vertical portion 58 and lower portion 60 of the trench, and is designated by the numeral 66 in FIG. 4. Thus, the trench makes a seed bed which fills with mechanically aggregated soil crumbs which are thrown from the rotary tiller blades as the planter passes beyond the position shown in FIG. 4.

Referring to FIG. 5, the bottom 24 of seed tube shank 23 forms a V-shaped notch 26 in the aggregated soil 66. Because the soil 66 has been tilled and broken up by wheels 34, the bottom 24 of shank 23 moves easily through the soil and provides a satisfactory seed bed for the seed. The V-shaped bottom 24 of shank 23 aligns the seeds in the triangular slot 26 rather than permitting the seeds to be scattered over the width of trench 64.

FIG. 6 illustrates the seed 68 and insecticide 70 which have been deposited by seed tube 28 and insecticide tube 30. The V-shaped configuration of groove 26 causes the seed and insecticide to be centered in the trench and to reach a uniform depth. Also illustrated in FIG. 6 is the higher level of dirt or soil 62 carried backwards from the front of subsoil shank 16 which has been caused by virtue of the continuous rotation of wheels 34.

In FIG. 7, the enlarged portions 64 and 54 are shown nearly full of soil 62 which has been dropped by boot 22. Also a herbicide 72 is shown mixed in with the soil at the upper end of enlarged portion 64. This mixing action is caused by the rotating of wheels 34 which causes the dirt to be thrown and mixed with the herbicide exiting from herbicide tube 32. Incorporating the herbicide into the soil is important to the proper effective application of the herbicide.

FIG. 8 illustrates the last stage of the planting process wherein firming wheels 50 firm the soil over the top of the seed.

A U-shaped bracket 80 holds a chain 82 which is attached to wheel frame 52. A spring 84 is inserted in chain 82. The chain is adjusted to reduce the compaction pressure on the planted row by increasing the tension on the spring when soil is damp and to increase the pressure on planted rows by reducing the tension in the spring when the soil is dry.

The rotary tiller provides the important function of filling the trenches 58, 64 and 65 left by the subsoil as the tiller continues to rotate in the gap between the rear of the fertilizer tube and the front of the seed tube. The shaft of the seed tube directs the flying soil into the subsoil trench, filling the trench 58 and then forming the soil over the trench to receive the seed falling down the seed tube. The bottom 24 of the seed tube 23 is triangular shaped as in the fashion of a boat keel. This provides a triangular slot 26 with the apex of the triangle at the bottom of the groove.

As the flying soil 55 containing the herbicide settles over the seed it is thoroughly mixed with the layer of soil located just under the surface of the last flying soil 55 being deposited in the row. The depth of the layer of soil containing herbicide can be regulated by the fore and aft positioning of the herbicide tube. The position of the herbicide tube can be regulated so soil deposited from boot 22 contains little or no herbicide.

The soil firming wheels press the soil from the side and give the soil over the seed bed a ridge like appearance. During rain the soil on the surface may be puddled by the wetting action and impact of raindrops. Excess water washes the puddled soil off the ridge and it settles in the two grooves left by the firming wheels. The water collected in the grooves infiltrates into the soil and wets the seed bed from the side rather than from the top.

The planter may be power take-off operated and a clutch is used to engage the mechanism for metering the seeds, insecticide and herbicide the moment forward motion of the planter begins. Hydraulic or electric drives may also be used. The size and weight of the planter can be materially reduced over prior art devices because weight is not needed to press the soil engaging discs or runners into the soil. Pressure is not required on the press wheels to operate the seed metering mechanism.

Short knives or blades 44 are placed on each side of the rotary wheels to shove the crop residue to the side to clear a wider bare area over the row. These shorter blades are normally set to mill about one-half inch of soil from the top of each side of the row to destroy growing weeds and grass growing in the row area, and to remove germinated weed seeds. The debris on the surface of the soil is chopped both by blade 42 and 44 in such a manner to minimize the hindrance of any debris or residue to the planted row.

THe boot 22 shown in the drawings has a width approximately equal to the width of trench 65. The soil moved sideways by blades 44 is pushed under the lower edges of the boot 22.

In an alternative configuration (not shown) boot 22 can be sized to enclose only blades 42, and to leave blades 44 outside the boot. This arrangement would allow all soil and debris moved by the blades 44 to be thrown sideways away from trenches 64 and 65.

In the drawings blades 42, 44 are shown to be turned axially inwardly and outwardly respectively. However, in an alternative configuration (not shown), both of these blades 42, 44 may be turned axially outwardly from the centerline of trenches 64, 65.

Thus, it can be seen that the device accomplishes at least all of its stated objectives.

What is claimed is:

1. A method for minimum tillage planting comprising moving a minimum tillage planter in a first direction over the soil to be planted;
   tilling the soil with a pair of spaced apart parallel tiller wheels rotatably mounted on said planter about a horizontal axis, each of said wheels having a plurality of radially extending blades terminating in outer radial ends which are turned inwardly toward the space between said wheels whereby said tiller wheels throw tilled soil inwardly toward said space;
   forming a first trench of predetermined depth with a subsoil shank on said planter positioned between said wheels;
   freeing said subsoil shank of debris by passing the outer radial ends of said rotating wheels closely adjacent the opposite sides of said subsoil shank and by engaging the soil forwardly of said subsoil shank;
   depositing fertilizer in said first trench with a fertilizer tube on said planter having a discharge end positioned behind said subsoil shank;
   covering said deposited fertilizer at least partially with soil being thrown into said first trench by said filler wheels as said planter moves in said first direction;
   forming a second trench in the soil deposited in said first trench with a seed tube shank positioned on said planter between said tiller wheels and spaced rearwardly of said fertilizer tube;
   depositing seed in said second trench with a seed tube located on said planter rearwardly of said seed tube shank and forwardly of the trailing edges of said tiller wheels whereby soil being thrown by said tiller wheels will fall over and cover said seed;
   firming the soil thrown by said tiller wheels over said seed.

2. A method according to claim 1 comprising confining the soil being thrown by said tiller wheels with a boot which surrounds said tiller wheels and said subsoil shank, said fertilizer tube, said seed tube shank and said seed tube.

3. A method according to claim 1 comprising clearing debris on the soil surface away from said trench by means of debris clearing blades located on each of said tiller blades.

4. A method according to claim 3 comprising engaging the soil beneath said debris with said tiller blades, and rotating said tiller blades so as to cause said blades to carry the soil and chopped debris from in front of said shank to the rear of said rotary tiller.

5. A method according to claim 1 comprising mixing a herbicide with the flying soil aggregates being thrown by centrifugal force from said rotating tiller blades, confining the mixture of said soil aggregates and herbicide with a shield surrounding said tiller blades so as to cause said flying mixture to settle into said trench.

6. A rotary tiller slot planter comprising:
   a subsoiler shank having a lower end positioned to engage the soil and make a first trench therein of first predetermined depth;

a fertilizer tube positioned rearwardly of said subsoiler shank and having a lower end for depositing fertilizer in the bottom of said first trench;

a seed tube shank positioned behind said subsoiler shank and having a lower end positioned to extend below said soil surface a second predetermined distance less than said first predetermined distance;

a seed tube positioned behind said seed tube shank for depositing seed in the soil behind said seed tube shank;

a pair of spaced apart tiller wheels rotatably mounted about a horizontal axis, each of said wheels being positioned on opposite sides of said subsoiler shank and said seed tube shank, said tiller wheels each having a plurality of blades extending radially outwardly from said horizontal axis and terminating in outer radial ends which engage the soil forwardly of said subsoiler shank and pass closely adjacent said subsoiler shank, said seed tube shank and said seed tube;

said outer radial ends of said blades turning inwardly toward said subsoiler shank and said seed tube shank whereby soil thrown by said tiller wheels will fall into said first trench in front of said seed tube shank and will also fall into said first trench behind said seed tube;

boot means surrounding said tiller wheels and said subsoiler shank, said fertilizer tube, said seed tube shank and said seed tube for confining the soil being thrown by said tiller wheels.

7. A rotary tiller slot planter according to claim 6 wherein said tiller wheels each rotate in a vertical plane which is substantially parallel to said first trench.

8. A planter according to claim 6 wherein said plurality of blades of said tiller wheels comprise a first group of blades extending radially outwardly to a first radial length and a second group of blades extending radially outwardly to a second radial length shorter than said first radial length.

9. A planter according to claim 8 wherein said outer radial ends of one of said first and second groups of blades are turned axially inwardly towards the longitudinal centerline of said trench and said outer radial ends of the other of said groups of blades are turned axially outwardly away from said longitudinal centerline of said trench.

10. A planter according to claim 9 wherein said group of inwardly turned blade ends in said first group of longer blades and said group of outwardly turned blade ends in said second shorter blades.

11. A planter according to claim 6 comprising an insecticide tube adjacent said seed tube for depositing insecticide adjacent said seed which has been deposited in the soil.

12. A planter according to claim 11 comprising a herbicide tube positioned rearwardly of said seed tube and said insecticide tube, said herbicide tube being adapted to deposite herbicide on the soil after said seed and insecticide have been deposited.

13. A planter according to claim 12 comprising a soil firming device positioned rearwardly of said herbicide tube for engaging and firming the soil after deposit of said fertilizer, seed, insecticide and herbicide.

14. A rotary tiller slot planter according to claim 12 wherein said blades of said tiller wheels pass closely adjacent said herbicide tube so as to cause soil to be thrown and mixed with said herbicide as said herbicide falls from said herbicide tube.

15. A rotary tiller slot planter according to claim 14 wherein said insecticide tube has a lower end spaced above the lower end of said seed tube and said herbicide tube has a lower end spaced above said lower end of said insecticide tube to facilitate mixing of said insecticide and herbicide with said soil being thrown by said tiller wheels.

* * * * *